US010380767B2

(12) United States Patent
Barker et al.

(10) Patent No.: US 10,380,767 B2
(45) Date of Patent: Aug. 13, 2019

(54) SYSTEM AND METHOD FOR AUTOMATIC SELECTION OF 3D ALIGNMENT ALGORITHMS IN A VISION SYSTEM

(71) Applicant: Cognex Corporation, Natick, MA (US)

(72) Inventors: Simon Barker, Sudbury, MA (US); David J. Michael, Wayland, MA (US)

(73) Assignee: Cognex Corporation, Natick, MA (US)

( * ) Notice: Subject to any disclaimer, the term of this patent is extended or adjusted under 35 U.S.C. 154(b) by 173 days.

(21) Appl. No.: 15/634,003

(22) Filed: Jun. 27, 2017

(65) Prior Publication Data

US 2018/0130234 A1 May 10, 2018

Related U.S. Application Data

(60) Provisional application No. 62/369,702, filed on Aug. 1, 2016.

(51) Int. Cl.
*G06K 9/00* (2006.01)
*G06K 9/62* (2006.01)
(Continued)

(52) U.S. Cl.
CPC ............ *G06T 7/85* (2017.01); *G06T 7/11* (2017.01); *G06T 7/33* (2017.01); *G06T 7/35* (2017.01);
(Continued)

(58) Field of Classification Search
USPC ................ 382/141, 209, 154, 294
See application file for complete search history.

(56) References Cited

U.S. PATENT DOCUMENTS 5,028,138 A 7/1991 Wolff
5,078,496 A 1/1992 Parker et al.
(Continued)

FOREIGN PATENT DOCUMENTS

JP 2010541112 A 12/2010
KR 20110020720 A 3/2011
(Continued)

OTHER PUBLICATIONS

Nayar et al., "Diffuse Structured Light", Apr. 28-29, 2015 Conference, pp. 1-10, Publisher: Columbia University, Published in: US.
(Continued)

*Primary Examiner* — Kathleen Y Dulaney
(74) *Attorney, Agent, or Firm* — Loginov & Associates, PLC; William A. Loginov

(57) ABSTRACT

A system and method for selecting among 3D alignment algorithms in a 3D vision system is provided. The system and method includes a 3D camera assembly to acquire at least a runtime image defined by a 3D point cloud or runtime 3D range image having features of a runtime object and a vision system processor. A training image is provided. It is defined by a 3D point cloud or 3D range image having features of a model. A selection process is operated by the vision processor. It analyzes at least one training region of the training image having the features of the model and determines a distribution of surface normals in the at least one training region. It also selects, based upon a characteristic of the distribution, at least one 3D alignment algorithm from a plurality of available 3D alignment algorithms to align the features of the model with respect to the features of the runtime object.

20 Claims, 5 Drawing Sheets

(51) Int. Cl.
*G06K 9/32* (2006.01)
*G06T 7/80* (2017.01)
*G06T 19/00* (2011.01)
*G06T 7/33* (2017.01)
*G06T 7/35* (2017.01)
*G06T 15/50* (2011.01)
*G06T 7/11* (2017.01)
*H04N 13/204* (2018.01)

(52) U.S. Cl.
CPC ............ *G06T 15/506* (2013.01); *G06T 19/00* (2013.01); *H04N 13/204* (2018.05)

(56) References Cited

U.S. PATENT DOCUMENTS

| | | |
|---|---|---|
| 5,557,324 A | 9/1996 | Wolff |
| 5,781,230 A | 7/1998 | Nguyen et al. |
| 6,064,759 A | 5/2000 | Buckley et al. |
| RE37,752 E | 6/2002 | Wolff |
| 6,504,957 B2* | 1/2003 | Nguyen ............. G01N 21/9515 348/36 |
| 6,539,107 B1 | 3/2003 | Michael et al. |
| 6,701,005 B1 | 3/2004 | Nichani |
| 7,929,775 B2 | 4/2011 | Hager et al. |
| 2002/0004710 A1* | 1/2002 | Murao ................. G06T 17/005 702/167 |
| 2004/0184653 A1* | 9/2004 | Baer ................. G01B 11/2509 382/145 |
| 2005/0180623 A1 | 8/2005 | Mueller et al. |
| 2005/0286767 A1 | 12/2005 | Hager et al. |
| 2008/0137949 A1* | 6/2008 | Zouhar ............. G06K 9/00214 382/168 |
| 2009/0116697 A1 | 5/2009 | Shalaby et al. |
| 2009/0310828 A1 | 12/2009 | Kakadiaris et al. |
| 2010/0315419 A1* | 12/2010 | Baker ................... G06T 17/20 345/420 |
| 2012/0099395 A1* | 4/2012 | Debrunner ............. G01S 15/89 367/21 |
| 2012/0314031 A1 | 12/2012 | Shotton et al. |
| 2013/0156262 A1* | 6/2013 | Taguchi .................... G06T 7/75 382/103 |
| 2013/0223673 A1 | 8/2013 | Davis et al. |
| 2014/0029823 A1 | 1/2014 | Birkbeck et al. |
| 2014/0052555 A1* | 2/2014 | MacIntosh ........... G06Q 20/208 705/23 |
| 2014/0267229 A1* | 9/2014 | Ding ...................... G09B 25/04 345/419 |
| 2014/0267614 A1 | 9/2014 | Ding et al. |
| 2014/0293091 A1 | 10/2014 | Rhoads et al. |
| 2016/0171754 A1* | 6/2016 | Ahn ..................... G06T 15/506 345/426 |
| 2016/0203387 A1* | 7/2016 | Lee ........................... G06T 7/73 348/44 |

FOREIGN PATENT DOCUMENTS

| | | |
|---|---|---|
| WO | 9740342 A2 | 10/1997 |
| WO | 200178005 A2 | 10/2001 |
| WO | 2013033442 A1 | 3/2013 |

OTHER PUBLICATIONS

Holz et al., "Registration With the Point Cloud Library PCL", "Robotics and Automation Magazine", Sep. 16, 2015, pp. 110-124, Publisher: IEEE, Published in: US.

Holz et al., "Registration With the Point Cloud Library PCL—A Modular Framework for Aligning 3D Point Clouds", Sep. 17, 2015, pp. 1-13, Published in: USA.

\* cited by examiner

SYSTEM AND METHOD FOR AUTOMATIC SELECTION OF 3D ALIGNMENT ALGORITHMS IN A VISION SYSTEM

RELATED APPLICATION

This application claims the benefit of co-pending U.S. Provisional Application Ser. No. 62/369,702, entitled SYSTEM AND METHOD FOR AUTOMATIC SELECTION OF 3D ALIGNMENT ALGORITHMS IN A VISION SYSTEM, filed Aug. 1, 2016, the teachings of which are incorporated herein by reference.

FIELD OF THE INVENTION

This invention relates to machine vision systems and more particularly to vision systems that identify and align three-dimensional (3D) image features with respect to a trained 3D pattern

BACKGROUND OF THE INVENTION

Machine vision systems, also termed "vision systems" herein, are used to perform a variety of tasks in a manufacturing environment. In general, a vision system consists of one or more camera assemblies with an image sensor (or "imager") that acquires grayscale or color images of a scene that contains an object under manufacture. Images of the object can be analyzed to provide data/information to users and associated manufacturing processes. The data produced by the camera is typically analyzed and processed by the vision system in one or more vision system processors that can be purpose-built, or part of one or more software application(s) instantiated within a general purpose computer (e.g. a PC, laptop, tablet or smartphone).

Common vision system tasks include alignment and inspection. In an alignment task, vision system tools, such as the well-known PatMax® system commercially available from Cognex Corporation of Natick, Mass., compare features in a two-dimensional (2D) image of a scene to a trained (using an actual or synthetic model) 2D pattern, and determine the presence/absence and pose of the 2D pattern in the 2D imaged scene. This information can be used in subsequent inspection (or other) operations to search for defects and/or perform other operations, such as part rejection.

A particular task employing vision systems is the alignment of a three-dimensional (3D) target shape during runtime based upon a trained 3D model shape. 3D cameras can be based on a variety of technologies—for example, a laser displacement sensor (profiler), a stereoscopic camera, a sonar, laser or LIDAR range-finding camera, time-of-flight camera, and a variety of other passive or active range-sensing technologies. Such cameras produce a range image wherein an array of image pixels (typically characterized as positions along orthogonal x and y axes) is produced that also contain a third (height) dimension for each pixel (typically characterized along a z axis perpendicular to the x-y plane). Alternatively, such cameras can generate a point cloud representation of an imaged object. A point cloud is a collection of 3D points in space where each point i can be represented as (Xi, Yi, Zi). A point cloud can represent a complete 3D object including the object's back and sides, top and bottom. 3D points (Xi, Yi, Zi) represent locations in space where the object is visible to the camera. In this representation, empty space is represented by the absence of points.

By way of comparison, a 3D range image representation Z(x, y) is analogous to a 2D image representation I(x, y) where the depth or height Z replaces what would be the brightness/intensity I at a location x, y in an image. A range image exclusively represents the front face of an object that is directly facing a camera, because only a single depth is associated with any point location x, y. The range image typically cannot represent an object's back or sides, top or bottom. A range image typically has data at every location (x, y) even if the camera is free of information at such locations. It is possible to convert a range image to a 3D point cloud in a manner clear to those of skill.

In aligning a target image, either acquired or generated by a synthetic (e.g. CAD) process, to a model image (also either acquired or synthetic), one approach involves the matching/comparison of the target 3D point cloud to the model in an effort to find the best matching pose. The comparison can involve a scoring of the coverage of the target with respect to the model. A score above a certain threshold is considered an acceptable match/pose-estimation, and this information is used to generate an alignment result. It is nevertheless challenging to accurately and efficiently generate an alignment result based upon 3D images.

Aligning 3D objects in 3D range images or 3D point cloud images is best accomplished with one or more, respective, 3D alignment (registration) algorithm(s) that is/are appropriate for the 3D shape of those objects. If an inappropriate 3D alignment algorithm is used, the 3D alignment procedure may fail or perform poorly either by finding an incorrect result pose or finding no result at all. Current approaches typically mandate that the user understand the details of which algorithm is appropriate for which objects of interest, or application situation, and manually choose the appropriate alignment algorithm provided by the vision system interface at setup (or alternatively, assemble the algorithm from a choice of modules provided by the vision system).

SUMMARY OF THE INVENTION

This invention overcomes disadvantages of the prior art by providing a system and method for automatically selecting the appropriate 3D alignment (registration) algorithm(s) for use in aligning a 3D object with respect to a trained 3D model defined as either a 3D point cloud image or a 3D range image. The system provides 3D alignment algorithms to automatically select-from via an interface of the vision system at training time. By way of example, the algorithms can include an Iterative Closest Point (ICP) algorithm, which is more appropriate to use with an image that has a high variance in surface normals, and a hybrid ICP edge-feature-based algorithm, which is more appropriate to analyze a shape of an object that includes edges and has a relatively unimodal distribution of surface normals. The system analyzes the trained 3D image to determine which type of shape it represents and selects the appropriate algorithm at training time. This training time selection is stored for use at runtime and employed in analyzing runtime objects with respect to the trained model 3D image. Alternatively, multiple algorithms can be trained, and the automatic selection can be deferred until runtime operation.

In an illustrative embodiment, a system and method for selecting among 3D alignment algorithms in a 3D vision system is provided. The system and method includes a 3D camera assembly to acquire at least a runtime image defined by a 3D point cloud or runtime 3D range image having features of a runtime object and a vision system processor. A training image is provided. It is defined by a 3D point cloud or 3D range image having features of a model. A selection process is operated by the vision processor. It analyzes at least one training region of the training image having the features of the model and determines a distribution of surface normals in the at least one training region. It also selects, based upon a characteristic of the distribution, at least one 3D alignment algorithm from a plurality of available 3D alignment algorithms to align the features of the model with respect to the features of the runtime object. Illustratively, the selection process is arranged to locate the at least one training region in the training image upon which to perform training, and the training image is acquired by the 3D camera assembly or provided as a synthetic image. The selected 3D alignment algorithm aligns the features of the model with respect to the features of the runtime object in at least one of a coarse 3D alignment process and a fine 3D alignment process. The characteristic of the distribution can be a degree of variance relative to a unimodal distribution of the surface normals, and the selection process is arranged to compare the degree of variance to a threshold. Illustratively, if the variance is higher than a high threshold value, then the selection process is arranged to select an ICP algorithm. Conversely, if the variance is lower than a low threshold, then the selection process is arranged to select a hybrid edge-based and ICP algorithm. At least one of the high threshold value and the low threshold value can be set by at least one of (a) an automated process or (b) a user-specified process. Also, at least one of the automated process and the user-specified process can be based upon a type of object in the training image. Illustratively, if the variance is between the high threshold and the low threshold, the selection process is arranged to prompt a user to select the at least one 3D alignment algorithm. In various embodiments, the 3D camera assembly can comprise a plurality of discrete 3D cameras located at spaced-apart positions to image a scene containing the runtime object. Alternatively, the 3D camera assembly can comprise a discrete 3D camera, using one of a variety of 3D image-acquisition technologies. Illustratively, if the high threshold is set lower than the low threshold, and the variance is between high and low, either or both algorithms can be trained.

BRIEF DESCRIPTION OF THE DRAWINGS

The invention description below refers to the accompanying drawings, of which.

DETAILED DESCRIPTION

Figure 1:
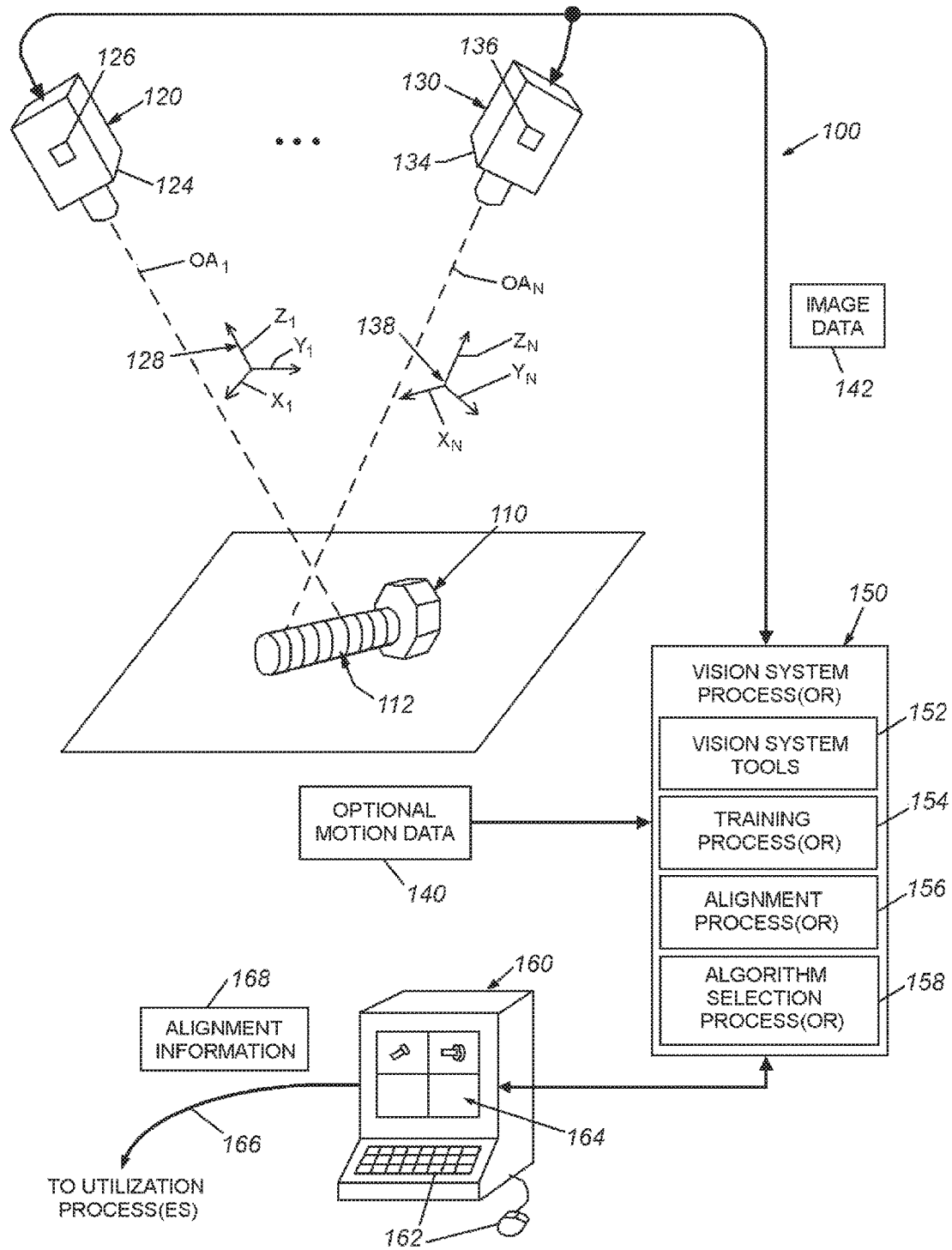
FIG. 1 is a diagram of a vision system including one or more 3D camera assemblies, acquiring an image of an object during training or runtime in which the appropriate 3D alignment (registration) algorithm is automatically selected by the vision system.

FIG. 1 shows a machine vision system arrangement (also termed herein, a "vision system") 100 for use in inspecting and/or analyzing features on the surface 112 of an object 110 that is imaged within the field of view (FOV) of one or more 3D vision system camera assemblies 120 and 130. Each camera assembly 120, 130 can be any acceptable arrangement of components for 3D imaging. The camera assemblies 120, 130 are each adapted to determine a third orthogonal dimension (e.g. height along the respective $z_1$, $z_N$ axis of each respective camera's coordinate system 128, 138) that constitutes a 3D "range image" of the object surface 112. A variety of technologies can be employed to generate height data for respective image pixels such as a laser displacement sensor (profiler), a stereoscopic camera, a sonar, laser or LIDAR range-finding camera, time-of-flight camera and a variety of other passive or active range-sensing technologies. Note that only one camera assembly, or a larger number (e.g. three or more) of camera assemblies, can be employed in an overall arrangement and the term "3D camera assembly" can be used alternatively herein to describe the overall arrangement of one or more discrete 3D camera assemblies for generating a 3D point cloud or range image representation of the object surface.

While not shown, one exemplary type of 3D camera assembly employed to generate a 3D range image or point cloud is a laser displacement sensor, which projects a fan of laser light (or another structured illumination) at the object surface 112 to form a line (e.g. oriented across the x-axis direction), and receives reflected light at the laser displacement sensor's respective imager 126, 136 from the projected line at a relative (acute) angle (A) between the plane of the illumination fan and respective imager's optical axis $OA_1$, $OA_N$. As described, other modalities can be used to generate range or height information, including, for example, LIDAR, structured light systems, stereo vision systems (e.g. a pair of spaced cameras 120 and 130), DLP metrology, etc. These systems all generate an image that provides a height value (e.g. z-coordinate) to pixels.

In a typical arrangement, the 3D camera assembly 120 and/or object 110 can be in relative motion (e.g. in the physical y axis coordinate direction of one or more cameras) so that the object surface 112 is scanned by the laser displacement sensor(s), and a sequence of images are acquired of the laser line at desired spatial intervals—typically in association with a motion controller and associated encoder or other motion-measurement device (or, alternatively, at time based intervals) that delivers motion information 140 to the system vision processor (150, described below). In that respect, the position of a point on the object along the motion direction is defined as coordinate Yi. The collection of points (Xi,Yi,Zi) acquired by the 3D camera assembly is defined as the point cloud. In other embodiments, the 3D camera assembly is not in motion relative to the object.

The camera body 124, 134 can contain various image processing components that constitute a vision system processor 150 that operates an associated vision process. The vision processor 150 operates upon image data 142 based upon the acquired images of the scene and/or other sources (e.g. a CAD representation of a model), and can employ vision system tools and processes 152 to extract information from the acquired image. This information can relate to features of interest and other items appearing within the image—for example vision system tools such as the well-known PatMax®, available from Cognex Corporation of Natick, Mass., can be used to analyze 2D and 3D features in the image and provide information on relative pose, alignment and other details—e.g. edges, blobs, etc. While some or all of the vision system processes can be instantiated within the body 124, 134 of the camera assembly 120, 130, it is expressly contemplated that some or all of the processes can be carried out by an interconnected (wired or wireless) computing device/processor 160, such as a purpose-built processor or a general purpose computer (e.g. server, PC, laptop, smartphone, tablet, etc.), with appropriate user interface (mouse/keyboard) 162 and/or display 164 (e.g. a touch screen). The interconnected computing device/processor 160 can employ the processed image data to carry out further utilization processes or tasks via a communication link 166 or other interface arrangement. For example, where the vision system carries out inspection tasks, the information can be used to provide quality control information to a database or to reject defective parts on a line. As described below, the utilization task includes use of 3D alignment information 168.

A training process(or) or module 154 handles the training and storage of one or more 3D models/representations composed of 3D range image or point cloud data that defines features that facilitate alignment of the model with found features from a runtime 3D range image or point cloud image of a runtime (target) object. The trained model(s) can encompass features found in an overall view of an object, different parts or orientations of a particular object, and/or multiple objects.

In the illustrative embodiment, the vision process and processor 150 includes an alignment process(or) or module 156 that employs an appropriate alignment algorithm (or process) that attempts to align the features of the model and those of the runtime (target) 3D image. The alignment process(or) 156 and training process(or) 154 each interoperate with a 3D alignment algorithm selection process(or) or module 158, which analyzes the model's 3D surface features in either a 3D range image or 3D point cloud image to determine which of a plurality of 3D algorithms is most appropriate to the surface shape.

Figure 2:
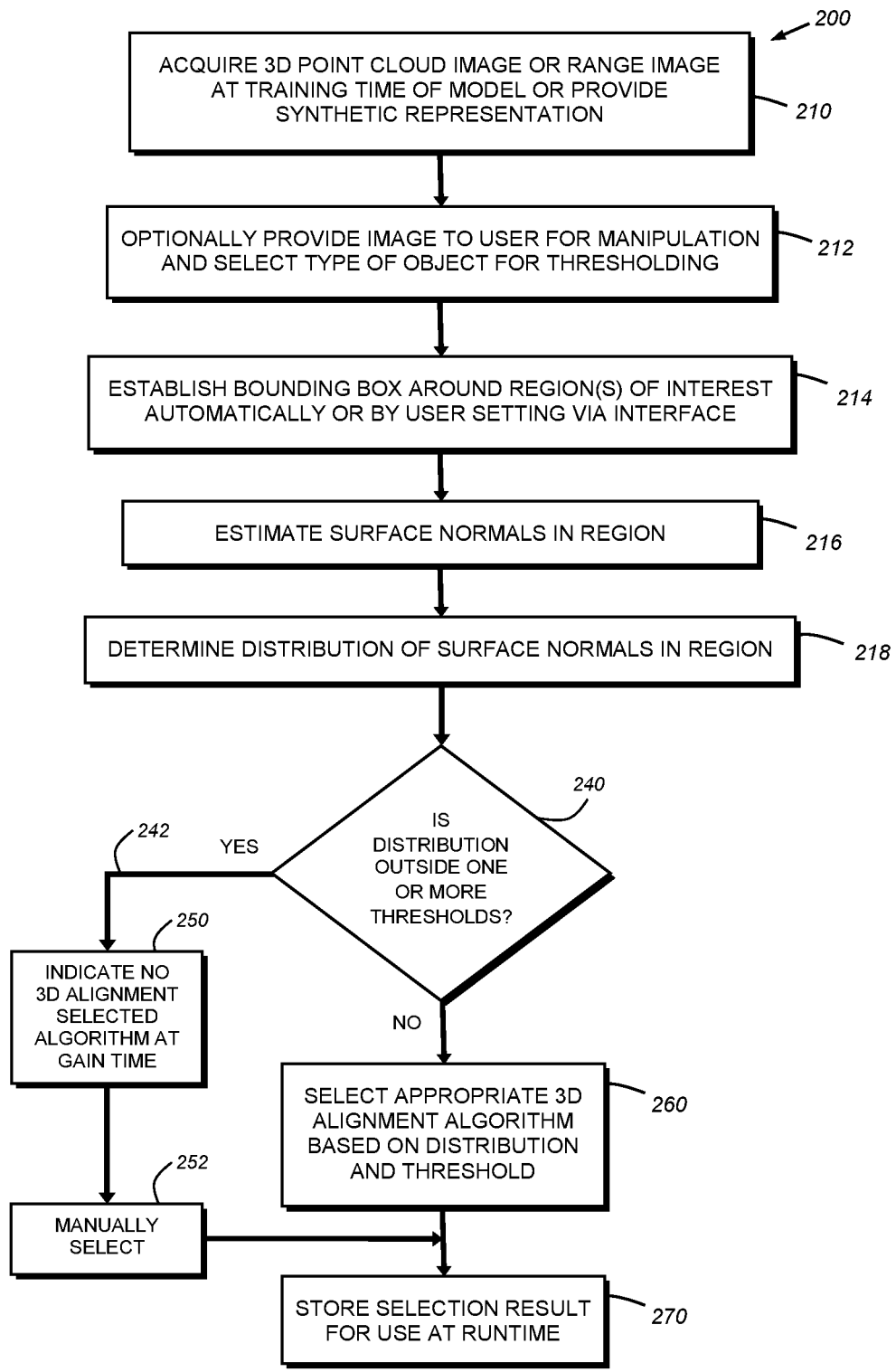
FIG. 2 is a flow diagram showing a procedure for automatically selecting an appropriate 3D alignment algorithm for use with predetermined features in a 3D point cloud image or range image during training time, according to an illustrative embodiment.

With reference to the training procedure 200 of FIG. 2, the system acquires or is provided with an image of a model as a 3D point cloud or range image at training time. This image can be produced by imaging a scene containing a model/training object in one or more orientations, or providing a "synthetic" (e.g. CAD) representation of the object and/or portions thereof. The actual or synthetic image can be provided to a user via an interface as part of the training process in step 212. Note that step 212 is optional and the image can be provided directly to the system free of any user input as to the type of object or threshold settings. Alternatively, the thresholds can be set based upon automated identification of the type of object or surface features using vision system tools. Where the user interface is employed, the image can be displayed as shown generally in the display 300 of FIG. 3. The user can manipulate the image, including the placement of a bounding box around some, or all, of the training object (step 214) as depicted by the bounding boxes 310 and 320 around respective images 312 and 322. The size and shape of the bounding boxes can be determined by the user, or the regions of interest can be bounded via automated mechanisms that should be clear to those of skill. Alternatively, the regions of interest and corresponding training features can be provided by the source of CAD data, or by/with the image data by some other modality. By bounding the region of interest to be analyzed, the alignment process omits any model features that are not relevant to alignment and/or background features separate from the model. Alternatively, the entire acquired image can be used a model.

In step 216 of the procedure 200 the algorithm selection process(or) (158 in FIG. 1) establishes surface normals on the features in the bounded regions of interest (310, 320), and uses the distribution of such surface normals (step 218) to determine the appropriate alignment algorithm for that object and distribution.

Figure 3:
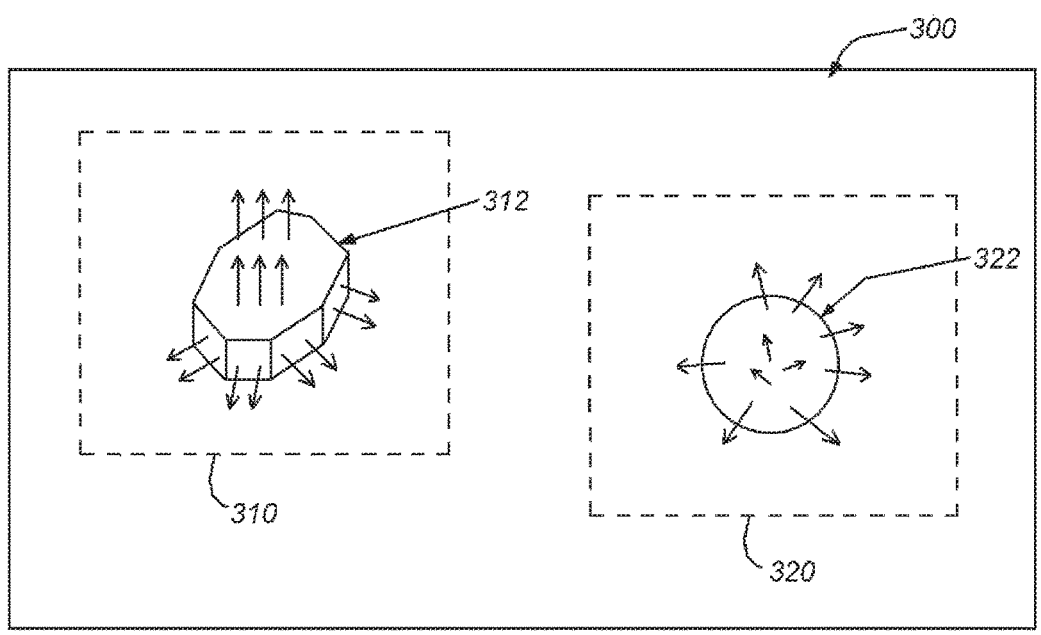
FIG. 3 is a diagram of an exemplary user interface screen showing bounding boxes provided around 3D features and associated surface normal associated with the 3D surface geometry of each exemplary feature set.

As shown in FIG. 3, the depicted surfaces (which are actually defined as a 3D range image or 3D point cloud) of models 312, 322 include sets of surface normals that represent the perpendiculars at local points along the respective surface. The granularity of normals is highly variable. In general, it can be part of the parameters specified by the user during training time or automatically determined by the alignment system during training time using (e.g.) techniques clear to those of skill. In general, the system can store sets of parameters for various types of surfaces and/or classes of objects that are commonly encountered by the system (e.g. bolts, balls, computer screen, circuit chips, bottles, cans, caps, etc.). Predetermined parameters are provided for such items. Alternatively, specific parameters can be set by the user for a particular model, or be determined automatically. Parameters can also be set for the specific orientation of the model. For example, a bottle will appear different viewed from its side than from its top.

Figure 4:
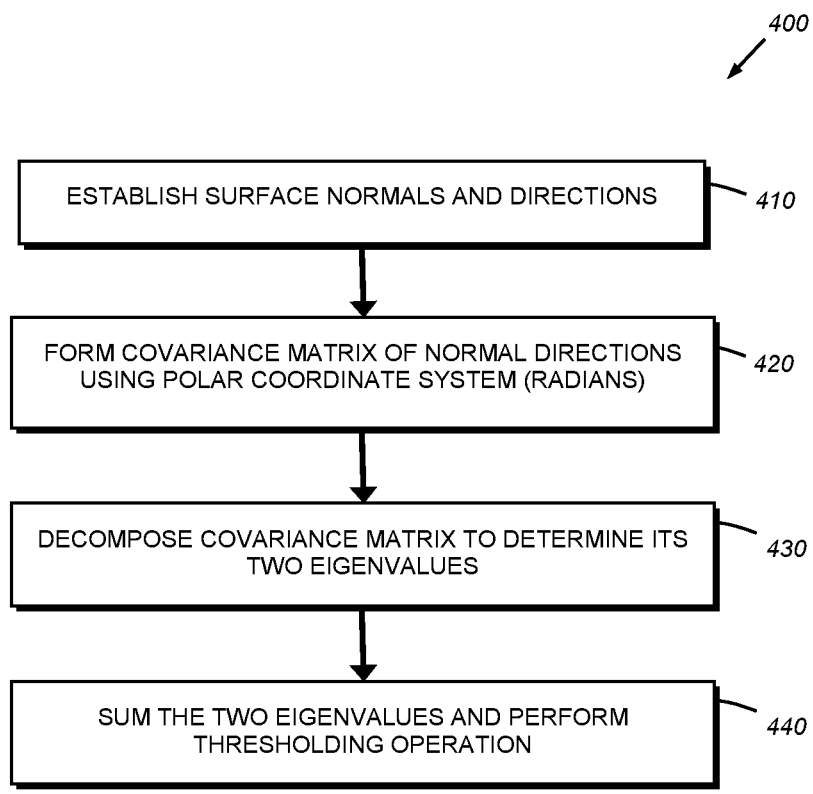
FIG. 4 is a flow diagram of an illustrative procedure for determining thresholds in the selection of 3D alignment algorithms according to FIG. 2.

With reference to FIG. 4, an exemplary procedure 400 is provided for selecting between algorithms by analyzing the distribution of surface normals. The procedure measures how much angular variation the normals exhibit with respect to each other and uses this measurement as the basis for algorithm selection. The procedure establishes surface normals in each region (step 410) as described above. The normals are used to form a covariance matrix of normal directions. Illustratively, the directions are expressed as polar coordinates in radians so that the variance is linear (step 420). The covariance matrix is decomposed so as to determine its eigenvalues (step 430). The eigenvalues can be summed and this sum is used in the thresholding operation (step 440) that determines the appropriate 3D algorithm. More generally, the procedure 400 attempts to determine whether the distribution of normals in a region is statistically unimodal. Other techniques can be employed to determine distribution, which should be clear to those of skill. Notably, the threshold used to determine the algorithm can be influenced by the type of object or surface and orientation thereof—entered by the user or determined automatically (where an object type can be reliably identified by the vision system).

In the training procedure 200 of FIG. 2, the distribution can be outside of certain ranges (decision step 240 and branch 242), so that the system cannot establish an appropriate 3D alignment algorithm for use in the process. As such, the procedure 200 flags this uncertain result in step 250. In such cases, the user can be prompted by the interface to select an algorithm manually (step 252), or this decision can be deferred until runtime. Where the determination (step 230) falls within a threshold (decision step 240), the procedure 260 automatically selects the appropriate 3D alignment algorithm for use with the trained model at runtime. Alternatively, the procedure can determine that a plurality of algorithms can operate most effectively/efficiently, and select the one with shortest execution time. The selection of an algorithm by either an automatic or manual technique is stored step 270 for use at runtime.

Note that multiple algorithms can also be trained on a given model where the result of the distribution determination falls outside of certain thresholds. The final selection of an algorithm can then be deferred until runtime operation—possibly attempting both to achieve alignment and determining which algorithm generates the better alignment result.

By way of non-limiting example, two common 3D alignment algorithms are the ICP and a hybrid edge-based/ICP. In the ICP algorithm, one 3D point cloud, the reference, or target, is kept fixed, while the other 3D point cloud, the source, is transformed to best match the target. The algorithm iteratively revises the transformation (combination of translation and rotation) needed to minimize the distance from the source to the reference point cloud. There can be an initial estimation of the transformation to align the source to the reference and one or more criteria for stopping the iterations is/are also provided. The algorithm outputs a refined transformation (result pose). In operation, the algorithm proceeds as follows:

For each point in the source point cloud, find the closest point in the reference point cloud;

Estimate the combination of rotation and translation using a mean squared error cost function that will best align each source point to its match found in the previous step;

Transform the source points using the obtained transformation; and

Iterate, re-associating the points.

The ICP algorithm is useful for certain object shapes where the surface normal distribution variance is high (for example model 322) (above a given "high" threshold). Conversely, a hybrid ICP and edge-feature-based algorithm is more desirable where a small variance (below a given "low" threshold) (for example model 312). There are a variety of available algorithms that employ both known edge-based alignment principles (e.g. using 3D edge detection to create 3D features that are matched between the model and runtime image) and ICP in combination. By way of example, a flat surface or box-like with low variance between normals will cause an ICP algorithm to fail as it attempts to iterate to align normals of the source and target. Conversely, the found 3D edges in such a 3D structure can form powerful constraints on alignment of the source and target. Thus, the algorithm can employ (for example), edge-based processes to initially align and ICP within the constraints of the edge aligned source and target. A description of 3D alignment using ICP and associated 3D alignment algorithms is provided, by way of useful background information, in Holtz, et al., *Registration with the Point Cloud Library*, IEEE Robotics and Automation Magazine, pp. 110-124, 16 Sep. 2015.

Figure 5:
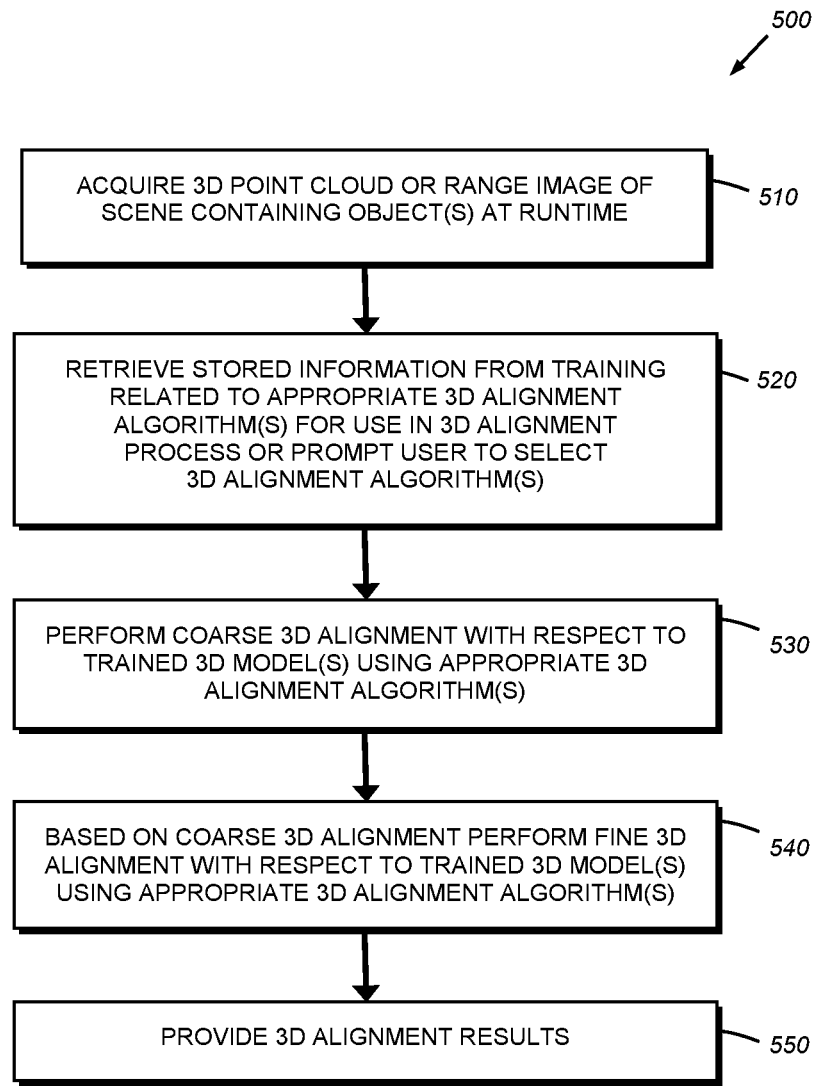
FIG. 5 is a flow diagram of a procedure for applying a selected 3D alignment algorithm from the procedure of FIG. 2 during runtime according to an illustrative embodiment.

Having stored one or more selected 3D alignment algorithms with respect to models at train time, the runtime procedure 500 for aligning models with features of acquired images is shown and described in FIG. 5. One or more runtime objects are placed within the field of view of one or more 3D cameras and one or more images of the scene are acquired in step 510. In step 520, the stored selection information from the training step is used to select the appropriate alignment algorithm (this can occur before or after coarse alignment). Alternatively, if no discrete selection of a 3D algorithm is made during training time, then the user can be prompted during runtime to identify the best algorithm for the runtime image of the object. A coarse alignment is performed in step 530 in which the identified features of the object(s) are coarsely registered with the model features. This can include comparing the features in the runtime image to various models to provide the closest match—for example an orientation of the model that is closest to the orientation of the runtime features. Coarse alignment can be based on alignment of edges or comparison of source and target surface normals, among other coarse registration techniques. Based upon the selection, 3D alignment is refined in step 540, and the runtime procedure 500 returns a 3D alignment result in step 550. The fine 3D alignment can be based on the selected algorithm(s) or on another technique, wherein the automatically selected algorithm is employed (optionally) exclusively during the coarse 3D alignment step. Conversely, the selected algorithms can be employed during both coarse and fine 3D alignment. Alternatively, one type of algorithm can be employed for coarse alignment (e.g. edge-based) and another type (e.g. ICP) can be used for fine 3D alignment.

Note that is expressly contemplated that additional algorithms can be employed for specific types of alignment tasks and associated model geometries, and these can be associated with the type of model at training time for use in either coarse or fine alignment at runtime. For example, resolving certain 3D shapes into 2D images and applying an edge-based affine transformation using vision tools (152 in FIG. 1)

It should be clear that the above-described system and method provides a convenient and effective technique for users to train 3D alignment systems to employ automatically select the appropriate 3D alignment algorithm where a plurality of choices are available. This system and method allows different algorithms to be employed on different portions of the overall object and on different orientations of the object so that the most efficient solution is provided. This system and method also allows for the user to select one or more algorithms at train time or runtime in situations where no particular selection can be made automatically.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A system for selecting among 3D alignment algorithms in a 3D vision system comprising:
a 3D camera assembly to acquire at least a runtime image defined by a 3D point cloud or runtime 3D range image having features of a runtime object and a vision system processor and a training image defined by a 3D point cloud or 3D range image having features of a model; and
a selection process, operated by the vision processor, that (a) analyzes at least one training region of the training image having the features of the model and determines a distribution of surface normals in the at least one training region, and (b) selects, based upon a characteristic of the distribution, at least one 3D alignment algorithm from a plurality of available 3D alignment algorithms to align the features of the model with respect to the features of the runtime object.

2. The system as set forth in claim 1 wherein the selection process is arranged to locate the at least one training region in the training image upon which to perform training.

3. The system as set forth in claim 1 wherein the training image is acquired by the 3D camera assembly or provided as a synthetic image.

4. The system as set forth in claim 1 wherein the at least one 3D alignment algorithm aligns the features of the model with respect to the features of the runtime object in at least one of a coarse 3D alignment process and a fine 3D alignment process.

5. The system as set forth in claim 1 wherein the characteristic of the distribution is a degree of variance relative to a unimodal distribution of the surface normals, and the selection process is arranged to compare the degree of variance to a threshold.

6. The system as set forth in claim 5 wherein (a) if the variance is higher than a high threshold value, then the selection process is arranged to select an ICP algorithm, and (b) if the variance is lower than a low threshold, then the selection process is arranged to select a hybrid edge-based and ICP algorithm.

7. The system as set forth in claim 6 wherein at least one of the high threshold value and the low threshold value is set by at least one of (a) an automated process or (b) a user-specified process.

8. The system as set forth in claim 7 wherein at least one of the automated process and the user-specified process is based upon a type of object in the training image.

9. The system as set forth in claim 6 wherein, if the variance is between the high threshold and the low threshold, the selection process is arranged to prompt a user to select the at least one 3D alignment algorithm.

10. The system as set forth in claim 1 wherein the 3D camera assembly comprises a plurality of discrete 3D cameras located at spaced-apart positions to image a scene containing the runtime object.

11. A method for selecting among 3D alignment algorithms in a 3D vision system comprising the steps of:
acquiring, with a 3D camera assembly, at least a runtime image defined by a 3D point cloud or runtime 3D range image having features of a runtime object and a vision system processor and a training image defined by a 3D point cloud or 3D range image having features of a model; and
selecting, with the vision processor that (a) analyzes at least one training region of the training image having the features of the model and determines a distribution of surface normals in the at least one training region, and (b) selects, based upon a characteristic of the distribution, at least one 3D alignment algorithm from a plurality of available 3D alignment algorithms to align the features of the model with respect to the features of the runtime object.

12. The method as set forth in claim 11 wherein the step of selecting locates the at least one training region in the training image upon which to perform training.

13. The method as set forth in claim 11 wherein the training image is either acquired by the 3D camera assembly or provided as a synthetic image.

14. The method as set forth in claim 11 further comprising aligning, with the at least one 3D alignment algorithm, the features of the model with respect to the features of the runtime object in at least one of a coarse 3D alignment process and a fine 3D alignment process.

15. The method as set forth in claim 11 wherein the characteristic of the distribution is a degree of variance relative to a unimodal distribution of the surface normals, and the step of selecting includes comparing the degree of variance to a threshold.

16. The method as set forth in claim 15 wherein (a) if the variance is higher than a high threshold value, then the step of selecting selects an ICP algorithm, and (b) if the variance is lower than a low threshold, then the step of selecting selects a hybrid edge-based and ICP algorithm.

17. The method as set forth in claim 16, further comprising setting at least one of the high threshold value and the low threshold value is set by at least one of (a) an automated process or (b) a user-specified process.

18. The method as set forth in claim 17 wherein at least one of the automated process and the user-specified process is based upon a type of object in the training image.

19. The method as set forth in claim 16 wherein, if the variance is between the high threshold and the low threshold, the step of selecting prompts a user to select the at least one 3D alignment algorithm.

20. The method as set forth in claim 11 wherein the 3D camera assembly comprises a plurality of discrete 3D cameras located at spaced-apart positions to image a scene containing the runtime object.

* * * * *